(12) United States Patent
Fischer et al.

(10) Patent No.: US 6,301,037 B1
(45) Date of Patent: Oct. 9, 2001

(54) LASER TRANSMITTING SYSTEM FOR USE IN OPTICAL SPACE COMMUNICATION SYSTEMS

(75) Inventors: Edgar Fischer, Muellheim Dorf; Bernhard Wandernoth, Kirchberg; Jean-Michel Mayor, Yverdon-les-Bains; Beat Schmid, Buelach, all of (CH)

(73) Assignee: Contraves Space AG, Zurich (CH)

( * ) Notice: Subject to any disclaimer, the term of this patent is extended or adjusted under 35 U.S.C. 154(b) by 0 days.

(21) Appl. No.: 09/036,312

(22) Filed: Mar. 6, 1998

(30) Foreign Application Priority Data

Mar. 7, 1997 (CH) .................................... 0549/97

(51) Int. Cl.$^7$ ............................ H04B 10/00; H04B 10/04
(52) U.S. Cl. ...................... 359/180; 359/135; 359/138; 359/180
(58) Field of Search .................................. 359/161, 180, 359/188, 133, 172, 156, 173, 122, 179, 159, 181, 120, 121, 138; 372/38, 32

(56) References Cited

U.S. PATENT DOCUMENTS

| | | |
|---|---|---|
| 4,556,980 | 12/1985 | Smith et al. . |
| 4,757,268 * | 7/1988 | Abrams ................................ 330/4.3 |
| 5,059,917 * | 10/1991 | Stephens ............................. 330/4.3 |
| 5,121,400 * | 6/1992 | Verdiell ................................ 372/32 |
| 5,136,598 | 8/1992 | Weller et al. . |
| 5,264,960 | 11/1993 | Glance . |
| 5,321,718 | 6/1994 | Waarts et al. . |
| 5,392,308 | 2/1995 | Welch et al. . |
| 5,440,576 * | 8/1995 | Welch ................................... 372/50 |
| 5,499,261 | 3/1996 | Welch et al. . |
| 5,537,432 | 7/1996 | Mehuys et al. . |

(List continued on next page.)

FOREIGN PATENT DOCUMENTS 0 670 642 A1    9/1995   (EP) .
2 267 006 A    11/1993   (GB) .

OTHER PUBLICATIONS

Michael A. Krainak Intersatellite Communications Opto-electronics Research at the Goodard Space Flight Center Proceedings of the National Telesystems Conference (NTC), Washington, May 19–20, 1992 pp. 14–9 to 14–12.

(List continued on next page.)

Primary Examiner—Leslie Pascal
Assistant Examiner—Agustin Bello
(74) Attorney, Agent, or Firm—Townsend and Townsend and Crew LLP; Guy W. Chambers

(57) ABSTRACT

A system for operating a laser transmitting system for optical space communications, in particular in combination with the generation of amplified laser light under space conditions. The optical laser transmitting system here consists of a laser 2, acting as an optical oscillator, and an optical semiconductor amplifier 6 which are connected with each other by a polarization-maintaining optical fiber 4, or alternatively by an optical space connection. A light beam 8 exiting from the optical semiconductor amplifier 6 is converted via a special optical lens system 10 into a collimated light beam 12 with an even lateral extension and is radiated after further optical conversions.

20 Claims, 7 Drawing Sheets

U.S. PATENT DOCUMENTS

| | | | |
|---|---|---|---|
| 5,539,571 | | 7/1996 | Welch et al. . |
| 5,793,521 | * | 8/1998 | O'Brien ................................ 359/344 |
| 5,832,020 | * | 11/1998 | Kong ...................................... 372/72 |
| 5,847,816 | * | 12/1998 | Zediker ............................... 356/5.09 |
| 5,864,574 | * | 1/1999 | Welch .................................... 372/50 |
| 5,910,857 | * | 6/1999 | Scott .................................... 359/338 |
| 5,912,910 | * | 6/1999 | Sanders ................................. 372/22 |
| 5,933,271 | * | 8/1999 | Waarts ................................. 359/341 |
| 5,936,991 | * | 8/1999 | Lang ...................................... 372/50 |
| 5,986,790 | * | 11/1999 | Ota ...................................... 359/180 |
| 6,025,942 | * | 2/2000 | Scifres ................................. 359/125 |

OTHER PUBLICATIONS

Carlson et al.. Monolithic Glass Block Lasercom Terminal: Hardware Proof of Concept and Test Results SPIE 2381, pp. 90–102.

Marshalek et al. Lightweight, high–data–rate laser communications terminal for low–Earth–orbit satellite constellations SPIE 2381 pp. 72–82.

Araki et al. Laser transmitter systems for high–data–rate optical inter–orbit communications SPIE 2381 pp. 264–271.

Olson et al. Multipass Diode–Pumped Nd: YAG Optical Amplifiers at $1.06\mu m$ And $1.32\mu m$ *IEEE* vol 6, No. 5 May 1994 pp. 605–608.

Kane et al., Diode–Pumped Nd: YAG Amplifier with 52–dB gain SPIE 2381 pp. 273–284.

* cited by examiner

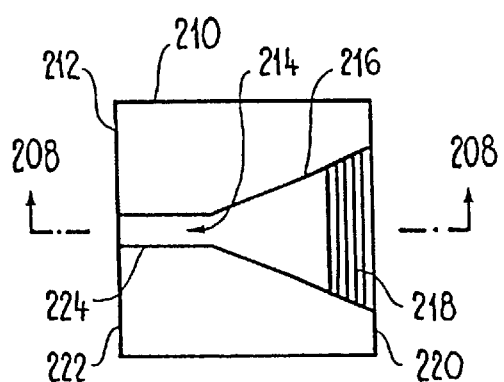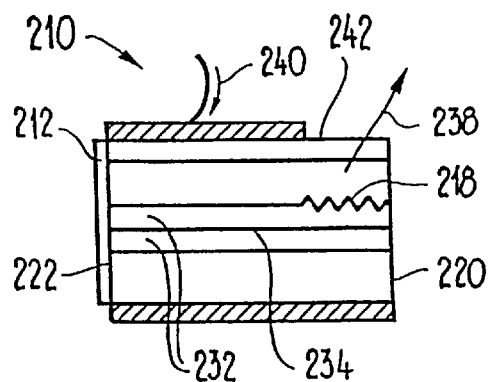
Fig. 15  Fig. 16
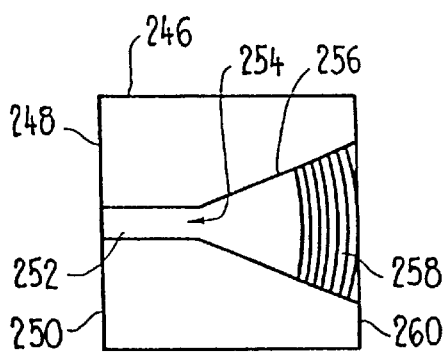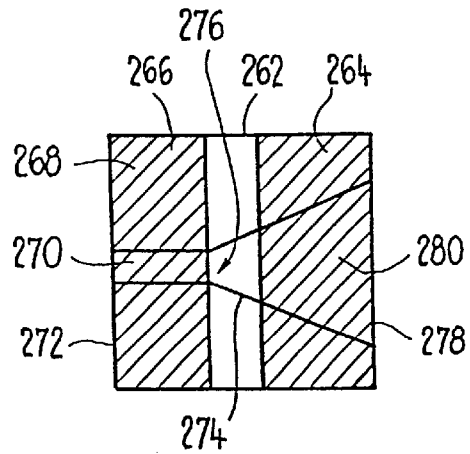
Fig. 17  Fig. 18
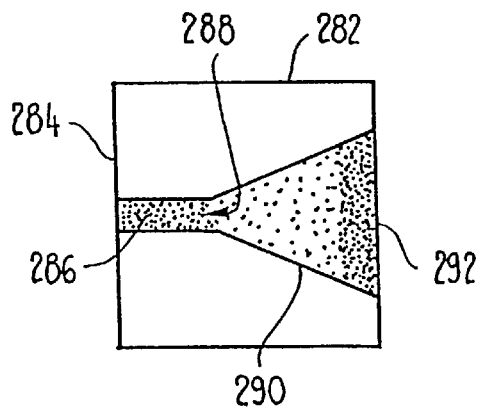
Fig. 19

LASER TRANSMITTING SYSTEM FOR USE IN OPTICAL SPACE COMMUNICATION SYSTEMS

FIELD OF THE INVENTION

The invention relates to a method for operating a laser transmitting system for use in optical space communication systems, in particular in connection with the generation of amplified laser light under space conditions. The invention further relates to an arrangement for executing this method.

BACKGROUND OF THE INVENTION

In the near future, systems for optical space communications between satellites, as well as between satellites and ground stations, will constitute an important and, on board of the satellites, weight-saving complement of the existing microwave technology. So-called optical terminals consist of one or several telescopes, which limit the angular range of the field of vision of an optical receiver in the direction to a counterstation, and also provide a directional transmission of signals to be transmitted. In addition, several movable mirrors are provided, by means of which the alignment of the transmitting and receiving direction is performed. Besides the direct detection of the optical output of the transmitter of the counter-station as the transmission method, the coherent superposition of the received light on the light of the same frequency from a local oscillator laser plays an important role since, besides great sensitivity to the signal to be detected, the insensitivity regarding interferences by background radiation is important.

Coherent methods need an additional local oscillator laser, on whose light the received light is superimposed on the photo detector of the receiver. Several types of lasers are available for all these purposes. Gas lasers offer the advantage of emitting light on only one optical frequency because of their so-called homogeneous spectral spreading of their optical output, although without any special measures, resonators of lasers have resonances on a whole series of equidistant frequencies. But this type of laser has a completely inadequate service life and dependability for applications in space. The diode lasers, which have achieved a high degree of development on account of their extensive employment in fiber-optical communications, represent an alternative at least for simple systems operating with intensity modulation and in addition are space-and weight-saving. But in spite of the operation on only one optical frequency, which has been achieved here also in the meantime, they are not yet generally suitable for coherent transmission methods with phase modulation, aside from complicated structures with large additionally coupled resonators. The reason lies in the still too large spectral width of this one transmitted optical frequency. Although fiber-optical coherent transmission systems also operate with commercially available diode lasers, detection is performed with a relatively large optical output because of the line-guided transmission, wherein in addition the use is limited to frequency modulation and differential phase modulation. In connection with the latter type of modulation, the change of the binary state of a data signal to be transmitted is transmitted by means of a modulated phase jump by 180 degrees of the transmitted light. The light beam is divided into two parts in the optical receiver and, with a mutual time displacement of the length of a data symbol, is sent to a common photodiode. Thus the light contains its own local oscillator, wherein the advantage of this method consists in that the phase of the unmodulated light used only needs to be stable within the framework of the length of a data symbol.

However, the interfering background radiation present in space, as well as the generally very low strength of the received signal, require an optical bandwidth of the unmodulated signal, which is considerably less than the modulation bandwidth. These are criteria which, together with small size and low weight, can best be met by diode laser-pumped solid-state lasers. Existing attempts to integrate the laser systems required for operation into a terminal for optical space communications have been described by Carlson et al. as well as Marshalek et al. (R. T. Carlson et al., "Monolithic Glass Block Lasercom Terminal: Hardware Proof of Concept and Test Results", SPIE vol. 2381, Free-space Laser Communication Technologies VII, February 7–8, 1995, San Jose, Calif., pp. 90–102: R. G. Marshalek et al., "Lightweight, High-Data-Rate Laser Communications Terminal for Low-Earth-Orbit Satellite Constellations", SPIE vol. 2381, Free-space Laser Communication Technologies VII, Feb. 7–8, 1995, San Jose, Calif. pp. 72–82).

Both groups of authors describe laser systems which are mechanically coupled to the optical device of the terminal and conduct their light emission by means of collimated beams. However, diode lasers have always been employed here. Diode laser-pumped solid-state lasers have a large volume and lesser efficiency, thus generate a larger amount of waste heat than comparable diode lasers. The increased amounts of heat produced in the vicinity of the optical system has been shown to be a risk for trouble-free operation of the optical devices. The unsatisfactory modulation capability of diode-pumped solid-state lasers represents a further problem. In contrast with diode lasers, the medium generating the optical output remains relatively long in an excited state after the pump energy has been supplied. Furthermore, the resonator of such lasers is considerably larger than that of diode lasers. Accordingly, limit frequencies of approximately 100 kHz are the rule for amplitude modulation, for example. The external modulation thus required is also very difficult to perform, since a high optical output must be manipulated, which requires the use of electro-optical modulators of low limit frequencies.

External modulation of laser light can be performed at high limit frequencies in modulators, in which the light is conducted through a waveguide, which permits a close mutual distance between the electrodes conducting the modulating voltage, and therefore a reduced modulation voltage. Since, because of the large magnification of the optical intensity caused by the narrow cross section of the optical waveguide, this method only permits low optical output, the modulated optical signal must be post-amplified. Attempts to do this consist, for one, in taking over methods and devices which, in the meantime, have proven themselves in fiber-guided optical communication, for example by post-amplification of the modulated optical system by means of an erbium-doped fiber amplifier (T. Araki, M. Yajima, S. Nakamori, Y. Hisada. "Laser Transmitter Systems for High-Data-Rate Optical Inter-Orbit Communications". Free Space Laser Communications Technologies VII, Feb. 7–8, 1995, San Jose. Calif. pp. 264–272).

It is also possible to derive corresponding traveling wave lasers from diode laser-pumped solid-state lasers, wherein suitable devices are available especially for the post-amplification of light from lasers operating with the same technology, particularly for the diode laser-pumped neodymium-YAG solid-state lasers, which are very useful for optical space communications because of their narrow spectral width.

To achieve great amplification with at the same time low optical pumping output, the light to be amplified must be conducted on as many paths as possible through the zone of an amplifying medium radiated by the pumping light. Because of this, with a respectively constant volume density of excited atoms for each coupled-in photon of the light to be amplified, there is a multiple of the probability of generating additional photons corresponding to the number of passages. In spite of low pumping output it is therefore possible to achieve an astonishing amplification factor. However, the devices corresponding to the prior art are constructed from several elements requiring a lot of space and mass, which therefore only poorly meet space travel-specific requirements. Even special developments contain the risk of insufficient mechanical load-carrying ability (T. J. Kane, E. A. P. Cheng, B. Nguyen, "Diode-Pumped ND:YAG Amplifier with 52-dB Gain", SPIE vol. 2381, Free-space Laser Communication Technologies VII, Feb. 7–8, 1995, San Jose, Calif., pp. 273–284; T. E. Olson, T. J. Kane, W. M. Grossmann, H. Plaessmann, "Multipass Diode-Pumped NF:YAG Optical Amplifiers at 1.06 $\mu$m", Optics Letters, vol. 6, no. 5, May 1994, pp. 605–608). An additional problem for space travel applications consists in that the diode lasers used for generating the pump light also have a limited service life. It is accordingly necessary to maintain several redundant diode lasers for each diode laser-pumped solid-state laser and each diode laser-pumped optical amplifier in order to be able to replace outages. Several arrangements are known, wherein semiconductor structures, which allow a high optical output strength, are used for direct amplification by means of optical semiconductor amplifiers. For example, optical semiconductor amplifiers are described which have optical waveguides which, because of their extension laterally in respect to the spreading direction along the semiconductor junction, can conduct several modes of the light to be amplified along an electrically pumped semiconductor junction which generates an optical output. In accordance with U.S. Pat. No. 5,539,571, the exact control of the current flowing through the semiconductor still requires a high light output of the almost diffraction-limited strongly astigmatic light beam leaving the semiconductor chip. The amplifier can contain a broad. multimode, rectangular optical waveguide which, however, can also be designed trapezoidal to adapt itself to the path of the light caused by diffraction. Making use of the special shape of these waveguides, it is possible to realize lasers by means of this, which contain an unstable resonator (U.S. Pat. No. 5,392, 308), are particularly stable in respect to the optical frequency of their emissions (U.S. Pat. No. 5,537,432), or which can also be coupled to external resonators (U.S. Pat. No. 5,499,261). Corresponding lens systems for forming focused or collimated light beams from the divergent, strongly astigmatic light beams of such amplifiers are disclosed in U.S. Pat. No. 5,321,718.

Thus, considerable improvements can be attained by means of using the prior art in respect to optical semiconductor amplifiers in comparison with existing attempts of using diode laser-pumped solid-state amplifiers.

OBJECT AND SUMMARY OF THE INVENTION

It is therefore the object of the invention described below to avoid the disadvantages of the prior art in that amplified modulated light for transmission by an optical communications terminal is made available.

The device for executing the method for generating a modulated optical signal to be transmitted by an optical terminal, preferably for optical space communications between satellites, alternatively consists of a diode laser or a diode laser-pumped solid-state laser, whose light is amplified by an optical semiconductor amplifier. Modulation of the light is performed, for example, by the direct modulation of the supply current of a laser diode used as an oscillator, wherein amplitude and frequency modulation is provided. Further methods for modulating the light contain passive electro-optical materials, which are applied between the diode laser or diode laser-pumped solid-state laser used as an oscillator and the optical semiconductor amplifier and which permit the phase modulation of the laser light prior to its amplification by means of an electrical field controlled by a data signal. Possible embodiments are simple material segments provided with electrodes, through which a collimated beam of the light to be modulated passes, as well as waveguide structures made of appropriate materials and connected with optical waveguides, wherein the electrodes required for building up the electrical field are attached at the edge of the waveguide and can have the shape of a high-frequency conductor, which guide the modulating field, which is in the form of a travelling wave matched to the group velocity of the light to be modulated, along the optical waveguide.

Amplitude modulation can be performed by electrically controllable absorbers or optical amplifiers, which can also be used in the embodiments known in connection with phase modulators. The phase modulation of a light wave passing through an optical semiconductor amplifier is possible in particular by means of a slight modulation of the supply current of the optical semiconductor amplifier, in the course of which a certain parasitic amplitude modulation of the light occurs. Parasitic amplitude modulation can be reduced by the series connection of several antagonistically modulated, differently constructed optical semiconductor amplifiers. It is furthermore possible to initially perform the modulation in amplitude or phase in an optical semiconductor amplifier of low saturation output in order to raise the modulated light thereafter to the transmitting output in a final amplifier operated by d.c. current. Such a structure can be put together of discrete optical semiconductor amplifiers, or can be embodied in the form of an integrated optical waveguide circuit. Structures with multimode optical waveguides are used as optical semiconductor amplifiers for providing the output to be radiated. In this case the waveguides can have a rectangular shape, or can continuously widen in the spreading direction of the light to be amplified. The widening of the optical waveguide takes generally place linearly along its length, but this is only for the sake of the simplicity of the embodiment, the actual criteria for the amount of widening of the waveguide consist in exceeding the divergence of the light coupled in over the narrower one of its two apertures. A further embodiment utilizes a waveguide which is exponentially widened in its width and which guides the light being propagated in it in both directions which are orthogonal in respect to the spreading direction. In addition, a metal contact intended for the provision of supply current to the semiconductor junction integrated in the optical waveguide and causing optical amplification constitutes a high-frequency strip conductor by means of its shape adapted to the course of the optical waveguide, wherein the group velocity of the modulation signals transmitted through it is matched to that of the light being propagated in the optical waveguide. A broad-band amplitude or phase modulation by means of an optical semiconductor amplifier is made possible by this.

Since semiconductor amplifiers have a relatively high failure probability, a multiple redundancy of optical semiconductor amplifiers is provided in a further development of the device in accordance with the invention. To the extent that the respective groups of components are connected with each other via optical waveguides, a selection can be made between several optical semiconductor amplifiers or other groups of components of the same kind of the system by means of electro-mechanical or electro-optical optical waveguide switches. Tolerating additional optical losses, these optical waveguide switches can be replaced by star couplers. In this way it is, for example, even possible to link N redundant optical transmitters with N redundant subsequent groups of components, so that every failure prone mechanical or electronic device is omitted. This method is recommended in case of serial arrangements, as long as the optical input strength required by the respectively following groups of components is low.

An inventive concept in connection with transmissions between groups of components by means of collimated light beams consists in the definition of the polarization of the collimated light beams at the interfaces of a special electro-mechanical reversing switch, wherein incoming collimated light beams are initially deflected by one polarization beam splitter arranged in a series in the direction toward an adjoining polarization beam splitter, and are subsequently rotated in their polarity by 90 degrees by means of a half-wave plate, in order to thereupon pass through all remaining polarization beam splitters in the direction toward the outlet terminal of the electro-mechanical selector switch, without being deflected by them. Collimated light beams at the various input terminals of this electro-mechanical selector switch can be passed to the output terminal by inserting a half-wave plate between the respectively two first polarization beam splitters through which the collimated light beam directed to the respective input terminal passes. In making a selection, this electro-mechanical/optical selector switch can also be used for selecting a collimated light beam from an input terminal of the system to several output terminals, since there is reciprocity as in all linear systems.

An advantage of this electro-mechanical selector switch lies in the fact that the only movable parts of this device are half-wave plates, which are designed as plan-parallel plates. Because of their generally slight thickness in the beam passage direction, the inexact orientation of these plates only becomes noticeable in a slight parallel displacement of the collimated light beam being switched through. Their increased mechanical sturdiness, reduced dimensions and lower weight in comparison to methods conceptualized with diode laser pumped solid-state amplifiers and the associated devices can be cited as advantages of the entire method and the devices required for it.

A further advantage can be derived from the fact that a diode laser-pumped solid-state amplifier requires the emissions of diode lasers as energy source. The dependability of diode lasers is comparable to that of optical semiconductor amplifiers. It is therefore possible to assume an increased dependability of the entire system because of reduced complexity of the method in accordance with the invention, since for diode laser-pumped solid-state lasers redundancy must also be provided in respect to the diode laser. The main advantage of the method in accordance with the invention, however, is a result of the low efficiency with which a diode laser-pumped solid-state laser converts the emission of the diode laser, which operates relatively efficiently, into usable light output. With a high degree of efficiency of approximately 30%, the optical semiconductor amplifiers operating on the basis of diode laser technology provide an efficient direct conversion of electrical output into usable optical output. Another important advantage furthermore lies in that considerably less waste heat is produced with the same optical output of the usable light.

Further details, characteristics and advantages of the invention ensue not only from the claims and the characteristics found therein, by themselves and/or in combination, but also from the subsequent description of preferred embodiments.

BRIEF DESCRIPTION OF THE DRAWINGS

FIGS. 9 to 21 represent various embodiments of optical semiconductor amplifiers.

DETAILED DESCRIPTION OF THE PREFERRED EMBODIMENTS

Figure 1:
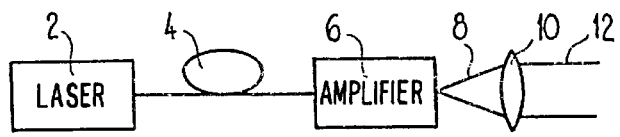
FIG. 1 is a block diagram of a schematically represented optical transmission system.

A block diagram of an optical transmitting system is represented in FIG. 1, which consists of a laser 2 acting as an optical oscillator and an optical semiconductor amplifier 6, which are connected with each other by means of a polarization-maintaining optical fiber 4. The laser 2 can be designed as a diode laser-pumped solid-state laser, which causes a narrow optical bandwidth of the unmodulated light emitted by this laser. Diode lasers are furthermore conceivable, which either emit at a higher optical bandwidth, or emit at a narrower bandwidth through an external resonator. In the latter case, as well as when using a solidstate laser, it is not possible to transmit a rapid data signal by direct modulation of the laser. In this case it is possible to achieve both phase and amplitude modulation by modulation of the supply current of the optical semiconductor amplifier 6. In addition, the laser 2 contains an optical system for transferring the emission of the laser into the polarization-maintaining optical fiber 4. The optical fiber 4 either leads directly into the optical semiconductor amplifier 6 or is also coupled into the amplifier by means of an optical system. The light beam 8 emerging from the optical semiconductor amplifier has an astigmatic structure because of the special shape of the aperture of very powerful optical semiconductor amplifiers. A special optical lens system 10 assures the conversion of the light beam 8 into a collimated light beam 12 of even lateral extension. Following further optical conversions, the collimated light beam 12 is transmitted.

The deviation from an ideal Gauss beam is negligibly small after reception in a counter station located in the far zone of the transmitter, i.e. it is possible to do without physical screens for beam purification.

Figure 2:
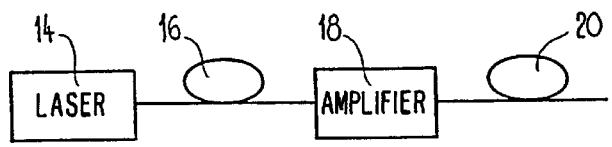
FIG. 2 is an alternative block diagram of a schematically represented optical transmission system.

FIG. 2 shows an alternative concept, wherein the light emitted by a laser 14 is coupled into a polarization-maintaining optical fiber 16, which leads to an optical semiconductor amplifier 18, whose output is connected to a further polarization-maintaining optical fiber 20. The amplified light is conducted through the optical fiber 20 to an optical system, through which the light is transmitted after it has been converted into a collimated beam.

Figure 3:
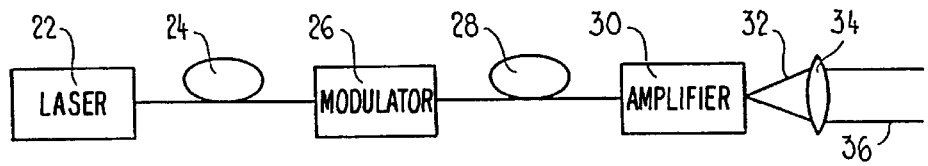
FIG. 3 is a further block diagram of a schematically represented optical transmission system.

A further realization of a transmitting system has been schematically represented in FIG. 3. A laser 22 generates unmodulated light, which is coupled into a polarization-maintaining optical fiber 24 and is supplied via the fiber 24 to an electro-optical modulator 26, which affects the amplitude or phase of the coupled-in light by means of a data signal. Arrangements of materials are possible for use as modulators, whose optical refractive index can be affected by the application of an electrical field, by means of which the phase of an optical field passing through the material can be affected. The amplitude of an optical field passing through this arrangement can also be affected by means of inferometer-like arrangements of waveguides made of such materials. Furthermore, semiconductor amplifiers with a relatively low output can be used, whose supply current is modulated. It is possible to achieve amplitude modulation by means of a large modulation of the supply current, while a relatively slight modulation of the supply current causes, besides a weak amplitude modulation of the light field, the modulation of its phase. The modulated light is coupled into a further polarization-maintaining optical fiber 28 and conducted into an optical semiconductor amplifier 30 of large output, whose supply current is not modulated. An astigmatically diverging light beam 32 emerging from this amplifier is converted into a collimated light beam 36 with even lateral extenison by means of a special lens system 34. Following the example of FIG. 2, passing the light on in an additional polarization-maintaining optical fiber is also possible. The optical semiconductor amplifier 30 can also be replaced by other optical amplifiers which are difficult to modulate.

The connections made through the polarization-maintaining optical fibers 4, 16, 24 and 28 can also be made via free optical connections (however, for the sake of clarity this has not been represented in the drawings).

Figure 4:
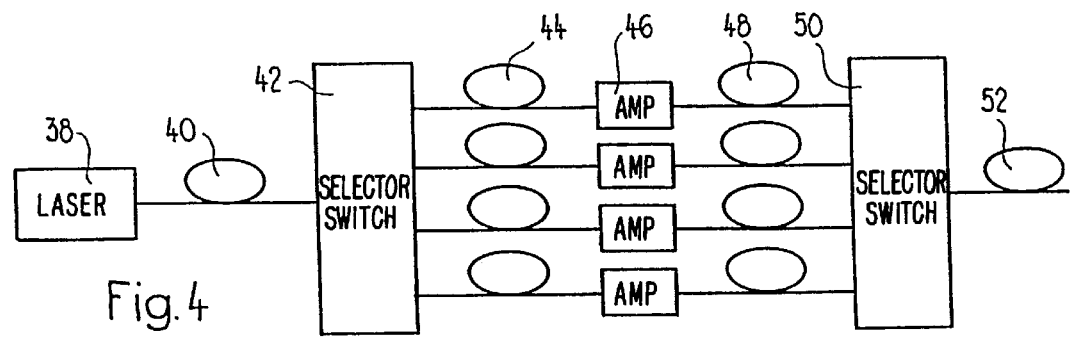
FIG. 4 shows a schematically represented optical transmission system with several redundantly inserted optical amplifiers.

FIG. 4 represents an optical transmitting system with several redundantly inserted optical amplifiers. A laser 38 emits light into a polarization-maintaining optical fiber 40, which leads to an electro-mechanical, or respectively electro-optical, selector switch 42, which allows the selective connection of the optical fiber 40 with further polarization-maintaining optical fibers 44. By means of this the light of the laser 38 is conducted through one of the optical semiconductor amplifiers 46, whose inputs and outputs are coupled to the optical fibers 44, or respectively further polarization-maintaining optical fibers 48. The optical fibers 48 lead to a further electro-mechanical, or respectively electro-optical selector switch 50, which connects the respectively light-conducting of the optical fibers 48 with a further polarization-maintaining optical fiber 52. In case the modulation of the light generated by the laser 38 was already performed in the laser itself, which in this case can be a simple diode laser, the amplifiers 46 can also be replaced by other, hard to modulate types. Furthermore, the optical amplifiers 46 can also be designed as a total system consisting of the modulator and the downstream-connected optical amplifier.

Figure 5:
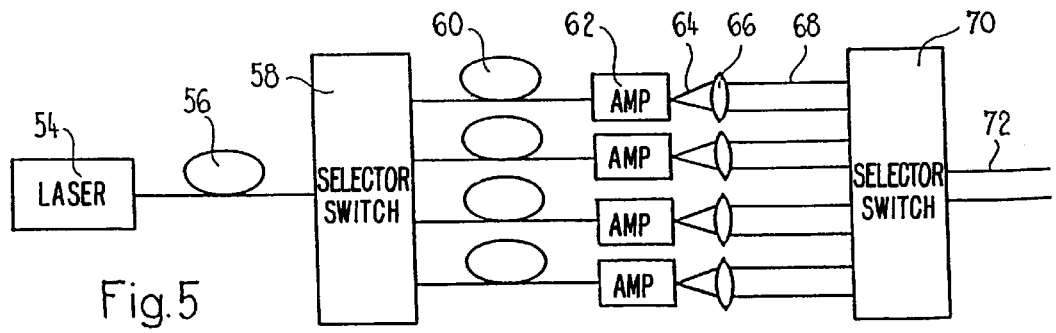
FIG. 5 shows a schematically represented optical transmission system with several redundantly inserted optical amplifiers and light partially conducted in collimated beams.

FIG. 5 represents an optical system, wherein the light, following amplification, is conducted further in collimated beams. A laser 54 generates the light which is coupled into a polarization-maintaining optical fiber 56 and is passed on through an electro-mechanical, or respectively electro-optical, selector switch 58 in one of additional polarization-maintaining optical fibers 60. The output of the latter enters one of several optical semiconductor amplifiers 62, in order to impinge at the output of the latter amplified in the form of an astigmatically divergent light beam 64 on a special optical lens system 66, which converts the light beam 64 into a collimated light beam 68, even in its lateral extension. The appropriately collimated light beam 68 impinges on an electro-mechanical selector switch 70 for collimated light beams in order to be converted into a collimated light beam 72 on the output side. Furthermore, the exclusive linkage of groups of components by means of free optical connections is also possible, in particular in that the electro-mechanical, or respectively electro-optical selector switch 58 is replaced by a further electro-mechanical selector switch 70 for collimated light beams (however, for the sake of clarity this is not represented in the drawings).

These electro-mechanical, or respectively electro-optical, selector switches 50 and 70 can also be replaced by so-called star couplers, so that every failure-prone mechanical or electronic device is omitted (this too, is not represented in the drawings for the sake of clarity.

Figure 6:
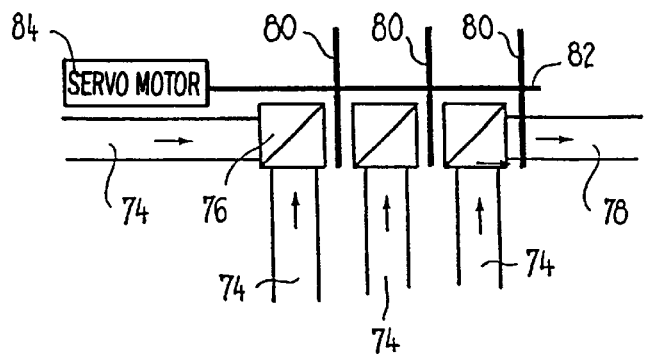
FIG. 6 is a schematic representation of an electro-mechanical selector switch for collimated light beams.

A more detailed schematic representation of the electro-mechanical selector switch for collimated light beams 70 is shown in FIG. 6. Collimated light beams 74 entering the device first impinge on polarization beam splitters 76, which have the property of reflecting light, or not to hinder its spreading, as a function of its polarity at their boundary surface represented by a diagonal line in their interior area. The horizontally entering light beam 74 is polarized in such a way that without being specially influenced, it passes through all polarization beam splitters 76 unhindered and makes a transition into an output beam 78. All remaining collimated light beams 74 are polarized in such a way that they are deflected at the boundary surface of the first polarization beams splitter 76 located in their spreading path in the direction of a further polarization beam splitter 76 or directly into the output beam 78. Since a further polarization beam splitter 76 would again deflect the light beam, it is necessary to rotate its polarization by 90 degree between the first two successive polarization beam splitters 76. This is accomplished by means of a half-wave plate, or respectively Kerr or Pockel cells, or special devices with liquid crystals. As an optical medium, half-wave plates have the property of having different refractive indices as a function of the polarization of incident light. If the polarization of a light beam is set between the two polarization directions at which the maximum, or respectively the minimum of the polarization-dependent refractive index occurs, the polarization of the light wave exiting from the half-wave plate is rotated by 90 degree, because the two partial waves of the impinging light wave, which have been propagated in the respective maximum or minimum of the polarization-dependent refractive index, have been displaced by half a wave length as a result of the thickness of the half-wave plate, which is set exactly for this purpose, and now are combined again into an orthogonally polarized light wave. The polarization of the collimated light beam 74 impinging horizontally in FIG. 6 does not require any correction, while the polarization of all other collimated light beams 74 must be rotated once by 90 degree in order to maintain the properties of the outgoing light beam 78 constant independently of the switched impinging light beam 74. Half-wave plates 80 are placed between the polarization beam splitters 76 by means of a shaft 82, which is being turned by a servo motor 84, and to which the half-wave plates have been attached in such a way, that they move, rotating in respect to each other, on circles around the shaft 82. By means of this it is possible, by setting the angle of the shaft 82, to bring all half-wave plates into their respective position between or next to a polarization beam splitter 76, depending on which collimated light beam 74 is intended to be changed into the outgoing light beam 78 by means of a half-wave plate.

Figure 7:
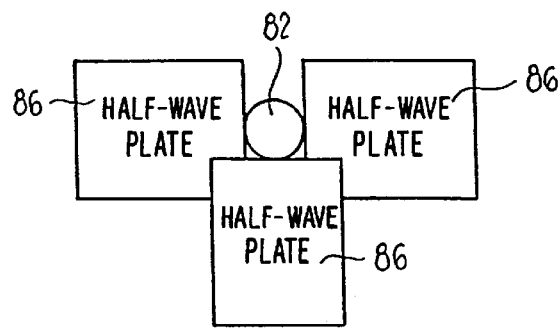
FIG. 7 represents an arrangement of semi-wave plates.

FIG. 7 shows the arrangement of half-wave plates 86 to be rotated on the shaft 82 of the system represented in FIG. 6. It is necessary to set the shaft sufficiently accurately to assure the correct polarization of the light impinging on the half-wave plates 86.

Figure 8:
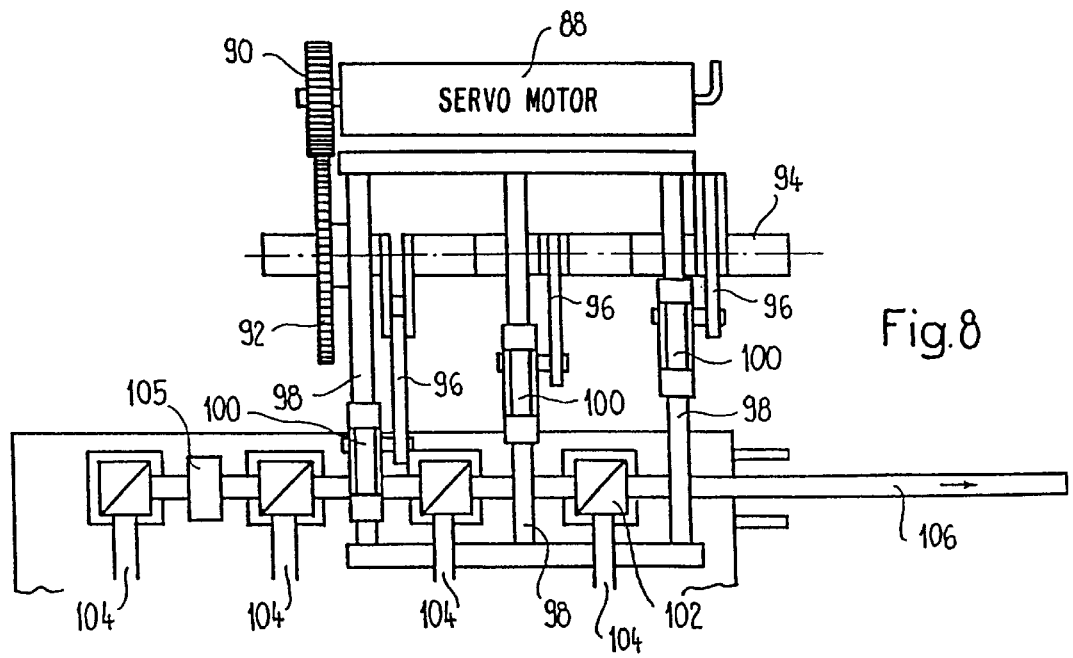
FIG. 8 is a representation of a further electro-magnetic selector switch for collimated light beams.

A system in accordance with the invention is represented in FIG. 8, in which the problem of the angle which must be accurately set is bypassed. By means of a gear consisting of a first gear wheel 90 and a further gear wheel 92, a servo motor 88 moves a crankshaft 94, on whose crank pins connecting rods 96 act, which are connected with half-wave plates 100 inserted into carriages. These move along rails 98, which only permit a translatorial movement of the half-wave plates, but no rotation in relation to the polarization of impinging collimated light beams 104. Rotations around an axis of rotation other than the one defined by the light beams 104 impinging orthogonally in relation to the surface of the half-wave plate 100 (or respectively to the redundant half-wave plate 105) and deflected by the polarization beam splitter 102, are not critical, since the half-wave plates 100 are plan-parallel, i.e. half-wave plates which neither refract like prisms nor have a refractive index. Obliquely impinging light beams are transferred, offset parallel in an amount which is a function of the angle of impingement of the beams, the refractive index of the material of the half-wave plates and its strength, and is generally small in comparison with the beam diameter, into an output beam 106.

Several embodiments of optical semiconductor amplifiers for use in the optical transmission systems are represented in FIGS. 9 to 18. All semiconductor chips represented in FIGS. 9 to 18 have been provided with a reflection-reducing optical coating at the inlet and outlet points for the light to be amplified. Care has been taken in the process that the coatings are produced in accordance with the dielectric constant of the media to be matched to each other.

Figure 9:
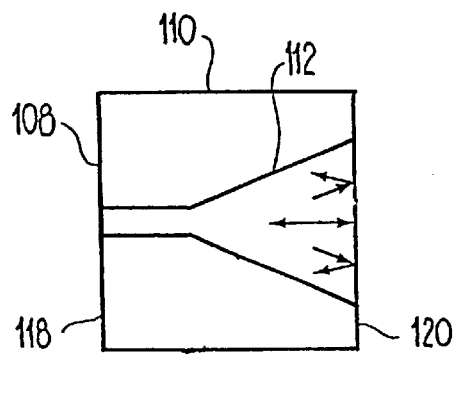
Figure 14:
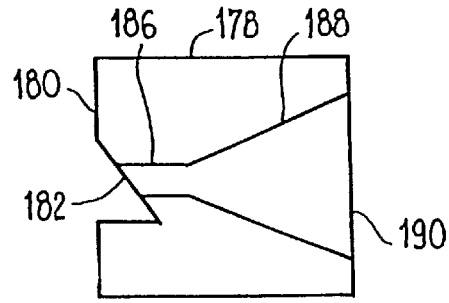

The semiconductor chip 110 in FIG. 9 has an optical wave structure which partially consists of a waveguide 118 which transmits the light only in a single mode, and a waveguide 112, which is widened in the spreading direction of the light to be amplified. The surfaces 108, or respectively 120, through which the light to be amplified enters, or respectively exits the waveguide structure, have been provided with a reflection-reducing optical coating. The width of the narrow side of the waveguide 112 has been matched to that of the monomode waveguide 188 (FIG. 14).

Figure 10:
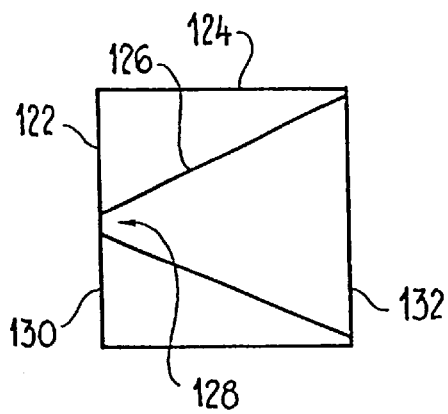

The semiconductor chip 124 in FIG. 10 does not have a monomode waveguide segment. It only has a waveguide 130, which widens in the spreading direction of the light to be amplified. Both the narrow end 128 and the wider opening of the waveguide 126 terminate at inlet, or respectively outlet, surfaces 122, or respectively 132, provided with a reflection-reducing optical coating.

The semiconductor chip 142 in accordance with FIG. 11 again has a monomode waveguide 138 and a waveguide 144 widening in the spreading direction of the light. However, on its narrow side 140, the widening waveguide 144 has a width 148 which is greater than the width of the adjoining monomode waveguide 138. In general, widening of the widening waveguide 144 is performed as a linear function of the length of the waveguide 136 with a factor which at least corresponds of the refraction-related widening of the light beam to be amplified, so that the latter can spread unhampered inside the amplifying medium located inside the waveguide 136. It is not necessary that the widening of the waveguide 136 along its extension takes place exactly linearly, as long as the spreading light beam is not limited in its spreading in the waveguide 144 by the edge of this waveguide. An inlet surface 134 as well as an outlet surface 146 for the light to be amplified have been provided with a reflection-reducing optical coating.

Figure 11:
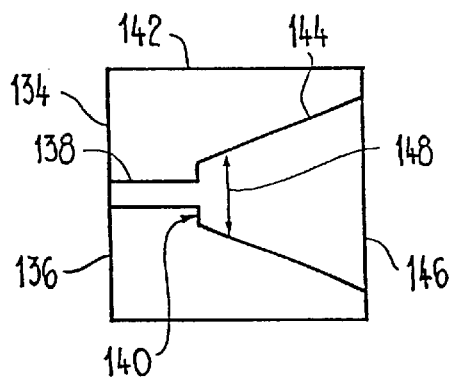

The widening waveguides 112, 126 and 144 in FIGS. 9 to 11 contain a medium providing an optical gain, by means of which the optical output of light to be amplified is typically raised from 5 mW to more than 1 W during its passage, wherein the optical output density along the extension of the waveguide remains constant. In addition, spreading of the light to be amplified takes place in a single mode, since no inhomogeneities occur in the gain-producing medium of the widening waveguides because of the constant optical output density with a constant density of the injection flow.

Figure 12:
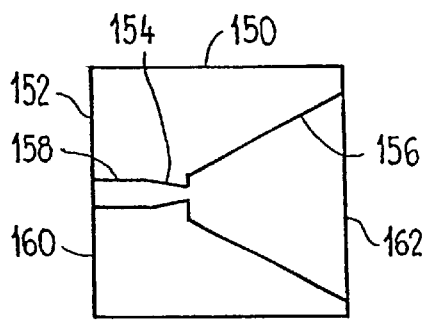

A semiconductor chip 150 is represented in FIG. 12, whose waveguide structure consists of a monomode waveguide element 158 of a complete waveguide 160, which is reduced in width in a section 154 in order to subsequently terminate in the wider of the narrow sides of a waveguide element 156 widening in the spreading direction of the light to be amplified. As in the previous explanations, the inlet surface 152 as well as the outlet surface 162 for the light to be amplified are provided with a reflection-reducing optical coating.

Figure 13:
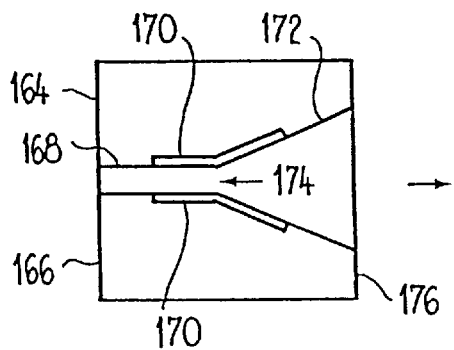

A further structure for an optical semiconductor amplifier is represented in FIG. 13. As in FIG. 9 the waveguide structure 166 consists of a monomode segment 168 as well as of a widening waveguide element 172, which is matched in its width and adjoins with its narrow side the monomode waveguide element 168. The inlet surface 164 for the light to be amplified, as well as the outlet surface 176 have been provided with a reflection-reducing optical coating. To suppress possible inherent vibrations on account of high optical amplification, as well as incomplete effects of the reflection-reducing coating of the inlet surface 164 and the outlet surface 176, dissipative edges 170 have been attached between the two waveguides 172 and 168, which are intended to suppress in particular the escape of amplified light, which is reflected at the outlet surface 176, from the waveguide 172, as well as its renewed reflection at the inlet surface 164 and its return into the waveguide 172. The small remaining portion of the reflected amplified light output, which enters an aperture 174 constituted by the end of the waveguide 168, in general is insufficient to cause inherent vibrations of the amplifier.

In accordance with FIG. 14, an optical amplifier can also be designed in the form of a semiconductor chip 178 containing a monomode waveguide element 186 and a widening waveguide element 188. The inlet surface 180 for the light to be amplified as well as its outlet surface 190 can be provided with a reflection-reducing optical coating. The transition of the monomode waveguide element 186 between the semiconductor chip 178 and the surroundings is a flat plane surface 182, which assumes the so-called Brewster angle in respect to the longitudinal axis of the monomode waveguide 186. Because of this, in connection with one polarization direction of the light coupled in or out through the surface 182, the reflection factor resulting from the transition between two media of different refractive indices disappears, independently of the presence of a reflection-reducing optical coating of the surface 182. If the monomode waveguide 186 is a structure with a small difference of the optical refractive index in relation to the solid body surrounding the waveguide, light reflected on the inside of the surface 182 will not be propagated in an opposite direction in the monomode waveguide element 186.

In accordance with FIG. 15 and FIG. 16, it is also possible to provide a widening waveguide 216 with an integrated non-resonating optical grating 218 in a semiconductor chip 210 which, in contrast to the emission of the light output from the lateral outlet surface 220, causes its emission from the surface in the direction of the arrow 238. Non-resonating gratings have a period change of the optical refractive index which prevents the beamed-in light from being scattered opposite the beamed-in direction. It is, however, possible to control the direction in which light is scattered. The non-resonating grating 218 is located relatively close to the outlet surface 220 of the semiconductor chip 210 and diffracts the light emerging from the waveguide 216 in the direction toward the top 242 of the semiconductor chip and is located in the vicinity of the lateral surface 220 at the edge of one of the layers 232, which constitutes the waveguide, encloses an active zone 234, which generates optical gain and has a higher refractive index than the surrounding semiconductor, as can be seen from FIG. 16, which represents a section of the semiconductor chip of FIG. 15 along the line 208—208.

FIG. 17 shows a semiconductor chip 246 with a monomode waveguide element 252, whose interior aperture 254 terminates in the narrow end, adapted to the width of the aperture 254, of a widening waveguide element 256. The inlet surface 248 as well as the lateral outlet surface 260 of the semiconductor chip 246 have been provided with a reflection-reducing optical coating. In contrast to the grating 218 embodied in FIGS. 15 and 16, a non-resonating optical grating 258 is matched to the course of the phase fronts of the light waves spreading through the widening waveguide element 256. By means of this the radiation of the amplified light wave in the form of an astigmatic light beam is prevented.

FIG. 18 explains the possibility, which is contrary to the prerequisite so far demanded, of not sending a constant supply current through the semiconductor structure generating the optical gain. A semiconductor chip 262 is coated with two metal layers 264 and 266, which are separated from each other and through which two generally different electrical currents 268 and 280 flow. The current 268 is conducted to a semiconductor junction generating an optical gain, which is located inside a monomode waveguide 270 and amplifies light therein, which is coupled in via the inlet surface 272. The amplified light makes a transition through a zone 276 of vanishing current density into a widening waveguide 274, wherein current 280 flows through the part adjoining the zone 276 and covered by the metal layer 264. Here, the optical amplification of the light to be amplified to the optical output strength exiting at the outlet surface 278 takes place. By means of the current-free zone 276 between the two waveguide elements, bounded by the waveguides 270 and 274 as well as by the metal layers 264 and 255, through which current flows, an amplification which is equal over the wave front is achieved in the widening waveguide element 274, and a higher optical output strength and reduced noise generation in the entire optical amplifier are caused by means of this. In addition, the metal layers 264 and 266 which are separated from each other allow the modulation of the light to be amplified at a high modulation bandwidth if the current 268 is controlled for the modulation of the light, while the considerably stronger current 280 is kept constant. The higher modulation width results from the lower capacitance of the semiconductor junction integrated into the monomode waveguide 270. Besides amplitude modulation, phase modulation is also possible by controlling the current 268, because by means of the current 268 the charge carrier density of the semiconductor material within the monomode waveguide 270, and therefore its optical refractive index, are affected, because of which the phase of the light exiting the monomode waveguide 270 is changed. The opposite modulation of several monomode waveguide segments placed in series behind each other and of different length and doping can keep the parasitic amplitude modulation occurring in the process low.

As FIG. 19 shows, it is also possible for achieving different optical amplifications within a structure consisting of several waveguides to affect the conductivity of the semiconductor material located above the semiconductor junction generating the optical gain. A semiconductor chip 282 contains a monomode waveguide 286 as well as an adjoining widening waveguide 290. The conductivity of the surface of the semiconductor chip 282 in the area of the waveguides 286 and 290 is produced by proton implants prior to covering with a metal layer, not represented in FIG. 19. In this case the employment of various masks permits a continuous distribution of conductivity on the surface of the semiconductor chip 282, which is indicated in FIG. 19 by the density of dots within the area of the waveguides 286 and 290. If a constant voltage is supplied to the metal layer to be imagined on the semiconductor chip 282, a corresponding distribution of the electrical current density through the semiconductor junction present in both waveguides 286 and 290, which generate optical gain, results. Because of the density of the dots for the monomode waveguide 286, a large optical gain follows in the example shown, and as a result thereof a correspondingly large optical saturation output, which enters a narrow side 288 of the widening waveguide 290. The current density in the left portion of the widening waveguide 290 has been set comparatively low in order to minimize distortions of the phase and the amplitude of the wave front caused by the relative fluctuation of the charge carrier density or by thermal fluctuations along the cross section. A higher current density is provided in the right portion of the widening waveguide 290, since now interferences in the wave front along a longer aperture have a less strong effect. The conductivity is reduced in the near vicinity of an inlet surface 284 and an outlet surface 292 for the light to be amplified, in order to reduce the thermal stress on the material by means of a reduced current density and in this way to increase the service life of the reflection-reducing optical coating of the inlet surface of the inlet surface 284 as well as the outlet surface 292.

Figure 20:
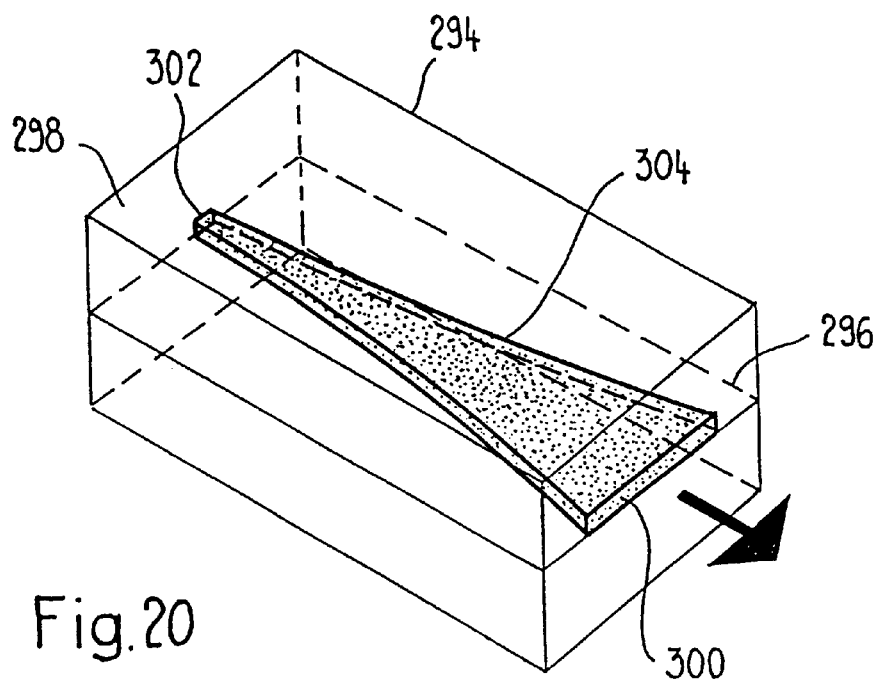

FIG. 20 permits a view into a semiconductor chip 294, which has an exponentially widening waveguide 304 in the plane 296 of a semiconductor junction generating an optical gain. While the widening waveguides described by means of the previous drawing figures are linearly widened over their length, but in principle only obey the law of conducting the light wave coupled in from a narrow monomode waveguide in only one dimension, but do permit its unhampered widening orthogonally in respect thereto, the waveguide represented in FIG. 20 conducts the light wave in two dimensions. By means of the exponential widening of the waveguide 304, which orients itself exactly by the optical amplification achieved in this waveguide, the optical output density and also the current density can in principle be better maintained constant along the semiconductor junction generating the optical gain. An inlet opening 302 as well as an outlet opening 300 of the waveguide 304 can be provided with a reflection-reducing optical coating. A metal layer required for supplying electrical current can be designed over the optical waveguide 304 in such a way that the wave resistance of this metal layer, which is employed as a high-frequency strip conductor, extends exponentially falling over the length of the optical waveguide 304 it covers and that therefore, in spite of a changing wave resistance, no reflection occurs. If particularly the group velocity of a rapid electrically modulating signal fed in the direction 298 corresponds to that of the light to be amplified, which is propagated in the optical waveguide located underneath it, it is possible, following the example of traveling wave phase modulators, to achieve an efficient phase modulation of the light to be amplified along with a high modulation bandwidth at the same time.

Figure 21:
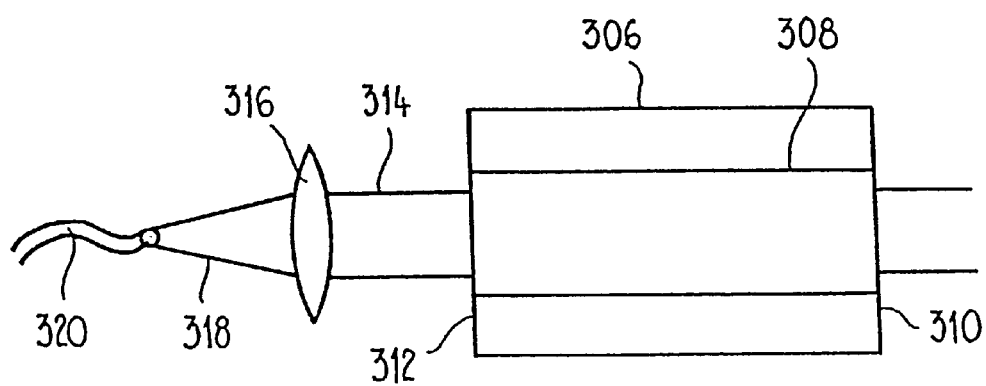

An optical amplifier is represented in FIG. 21, which contains a single, very wide optical waveguide. An optical waveguide 308 installed in a semiconductor chip 306 and also containing a semiconductor junction generating optical amplification, exceeds in width the width of a collimated astigmatic light beam 314, which radiates through the optical waveguide 308. The collimated astigmatic light beam 314 is generated by means of an optical lens system 316 from a divergent light beam 318 radiated through the end of an optical waveguide 320. The collimated light beam 314, which enters the optical waveguide 308 through an inlet surface 312 coated in a reflection-reducing manner, leaves the waveguide 308 through an outlet surface 310 coated in a reflection-reducing manner, and can be coupled back into the optical waveguide through a further lens system 316.

The strongly astigmatic light beam exiting the outlet sides of the semiconductor chips will be converted into a collimated light beam of even lateral extension by means of the lens systems represented in FIGS. 22 to 25.

Figure 22:
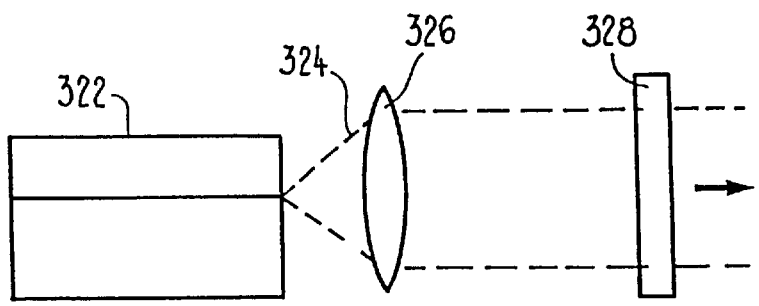
FIGS. 22 to 25 represent various embodiments of optical systems for the collimation of divergent astigmatic light beams.
Figure 23:
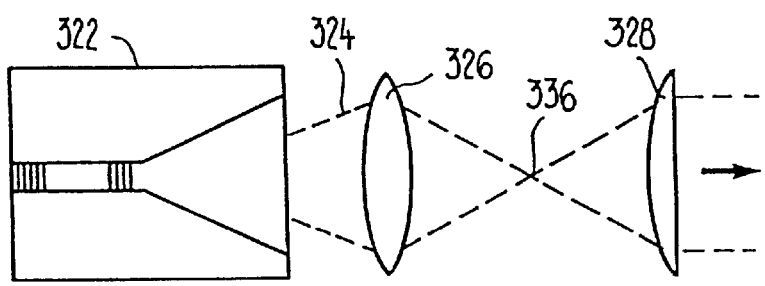

A divergent astigmatic light beam 324 from a semiconductor chip 322 is converted in FIG. 22 and FIG. 23 by a lens 326 into a collimated light beam in the direction of a transverse axis which is parallel with the longitudinal side of the radiating aperture, and is concentrated in the viewing direction represented in FIG. 23 along a transverse axis which is orthogonal to the previously mentioned transverse axis in a focal line 336. This light beam is completely collimated by a subsequent cylindrical lens 328.

Figure 24:
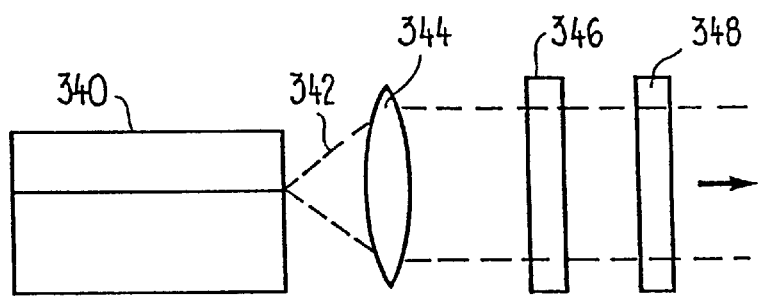
Figure 25:
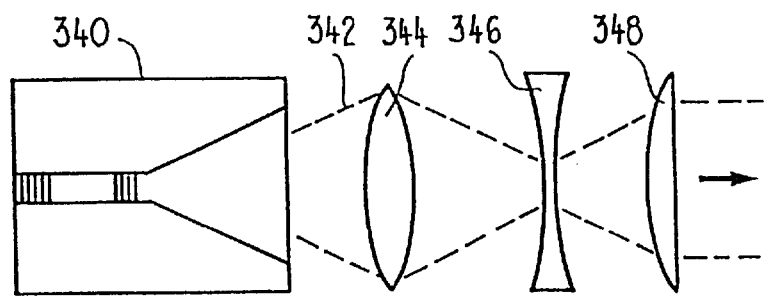

In accordance with FIGS. 24 and 25, an astigmatic divergent light beam 342 from a semiconductor chip 340 can be first collimated in a transverse axial direction by a lens 344 in order to cause a succeeding complete collimation of the light beam by means of a system consisting of cylindrical lenses 346 and 348 The combination of a concave and a convex lens which can be seen in FIG. 25 causes a shortening of the required length of the optical system, known from telephoto lenses for cameras.

In all optical systems treated in FIGS. 22 to 25 it is alternatively also possible to employ lenses with aspherical surfaces, these systems can furthermore consist of media with a matched extension of the refractive indices.

Figure 26:
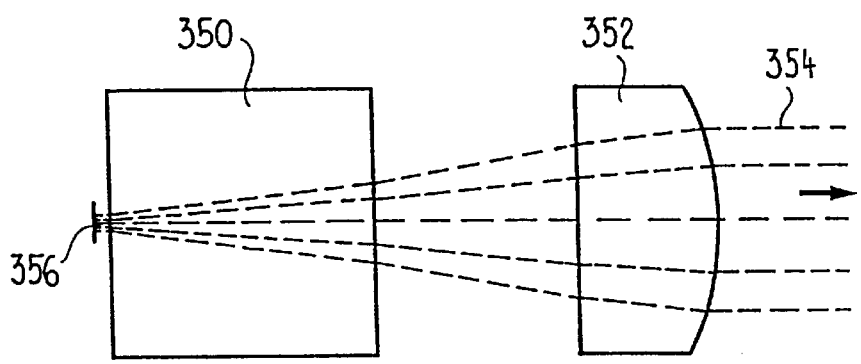
FIGS. 26 and 27 represent an embodiment in accordance with the invention in a top and a lateral view.

FIG. 26 represents a variant in accordance with the invention as an exemplary embodiment, namely the top view of an optical system for generating a collimated light beam 354 with even lateral extension from a strongly astigmatically radiating aperture 356 through cylindrical focusing lenses 350 and 352, which can be embodied with acylindrically curved surfaces.

Figure 27:
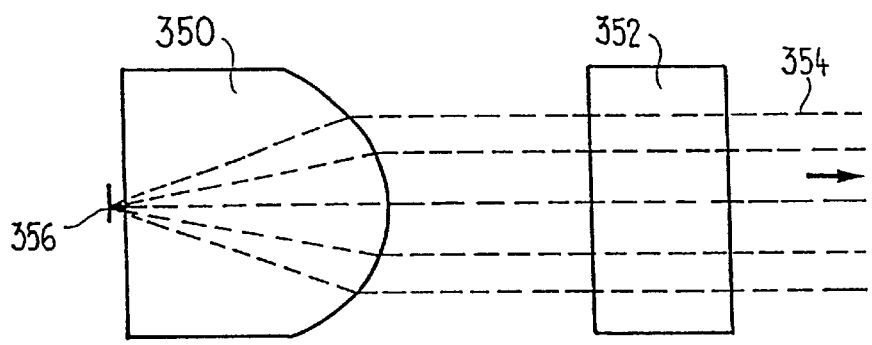

FIG. 27 represents the same system in a lateral view.

What is claimed is:

1. A laser transmitting system for use in optical communications comprising:
   a laser,
   a first selector switch connected to said laser,
   a plurality of optical semiconductor amplifiers which receive laser light from said first selector switch wherein each of said amplifiers comprises a semiconductor chip having an optical waveguide structure which changes in cross section along the propagating direction of laser light waves and wherein said chip is covered by an electrically conductive layer through which electrical current is passed; and,
   a second selector which receives laser light from said amplifiers.

2. The laser transmitting system in accordance with claim 1, wherein said first and second selector switches are selected from the group of electro-mechanical switches, electro-optical switches and star couplers.

3. The laser transmitting system in accordance with claim 1, wherein said optical semiconductor amplifiers and said second selector switch produce collimated light beams.

4. The laser transmitting system in accordance with claim 3, wherein said second selector switch produces its collimated light beam by processing collimated light beams received from said optical semiconductor amplifiers through a combination of polarization beam splitters and half wave plates.

5. The laser transmitting system in accordance with claim 4, wherein said half wave plates are connected together by a rotating crankshaft.

6. The laser transmitting system in accordance with claim 1, wherein said laser optical connections are made by either polarization-maintaining fibers or via free optical connections.

7. The laser transmitting system in accordance with claim 1, wherein said laser includes a diode laser or a diode laser-pumped solid state laser.

8. The laser transmitting system in accordance with claim 1, wherein said optical semiconductor amplifiers are formed by semiconductor chips whose inlet and outlet surfaces are coated in a reflection-reducing manner.

9. The laser transmitting system in accordance with claim 1, further comprising optical lenses connected downstream of said optical semiconductor amplifiers.

10. The laser transmitting system in accordance with claim 9, wherein said optical lenses consist of two cylindrical focusing lenses which have an acylindrical curved surface.

11. The laser transmitting system in accordance with claim 1, wherein the optical semiconductor amplifiers modulate, as well as amplify, the laser light.

12. The laser transmitting system in accordance with claim 1, wherein at least one of said optical semiconductor amplifiers contains a broad, multimode rectangular or trapezoidal wave guide.

13. A laser transmitting system for use in optical communications comprising:
    a laser,
    a first selector switch connected to said laser,
    a plurality of optical semiconductor amplifiers which receive laser light from said first selector switch wherein each of said amplifiers comprises a semiconductor chip having an optical waveguide structure which changes in cross section along the propagating direction of laser light waves and wherein said chip has electrodes in the shape of high-frequency conductors for building up an electrical field to modulate the laser light; and, a second selector which receives laser light from said amplifiers.

14. The laser transmitting system in accordance with claim 13, wherein said optical semiconductor amplifiers and said second selector switch produce collimated light beams.

15. The laser transmitting system in accordance with claim 13, wherein said laser optical connections are made by either polarization-maintaining fibers or via free optical connections.

16. The laser transmitting system in accordance with claim 13, wherein said laser includes a diode laser or a diode laser-pumped solid state laser.

17. The laser transmitting system in accordance with claim 13, wherein said optical semiconductor amplifiers are formed by semiconductor chips whose inlet and outlet surfaces are coated in a reflection-reducing manner.

18. The laser transmitting system in accordance with claim 13, further comprising optical lenses connected downstream of said optical semiconductor amplifiers.

19. The laser transmitting system in accordance with claim 18, wherein the optical lenses consist of two cylindrical focusing lenses which have an acylindrical curved surface.

20. The laser transmitting system in accordance with claim 13, wherein at least one of said optical semiconductor amplifiers contain a broad, multimode rectangular or trapezoidal wave guide.

* * * * *